United States Patent
Hansen et al.

(10) Patent No.: US 12,078,563 B2
(45) Date of Patent: Sep. 3, 2024

(54) FRICTIONAL TORQUE DETERMINATION TECHNIQUE

(71) Applicant: Southwest Research Institute, San Antonio, TX (US)

(72) Inventors: Greg Hansen, San Antonio, TX (US); Peter Lee, Fair Oaks Ranch, TX (US); Carlos Sanchez, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 176 days.

(21) Appl. No.: 17/858,426

(22) Filed: Jul. 6, 2022

(65) Prior Publication Data

US 2024/0011852 A1 Jan. 11, 2024

(51) Int. Cl.
*G01L 3/14* (2006.01)
(52) U.S. Cl.
CPC ..................... *G01L 3/14* (2013.01)
(58) Field of Classification Search
CPC ........................................................ G01L 3/14
See application file for complete search history.

(56) References Cited

U.S. PATENT DOCUMENTS

| | | | | |
|---|---|---|---|---|
| 5,679,883 A * | 10/1997 | Wedeven | ............... | G01N 19/02 73/10 |
| 6,167,745 B1 * | 1/2001 | Hamer | ............... | G01N 19/02 73/9 |
| 7,272,969 B2 * | 9/2007 | Shinohara | ............... | G01N 3/56 73/7 |
| 11,327,005 B2 * | 5/2022 | Potier | ............... | G01N 19/02 |
| 11,428,625 B2 * | 8/2022 | Zhang | ............... | G01N 3/56 |
| 2005/0120774 A1 * | 6/2005 | Shinohara | ............... | G01N 3/56 73/7 |
| 2016/0061703 A1 * | 3/2016 | Yoon | ............... | G01N 33/30 73/10 |
| 2017/0176319 A1 * | 6/2017 | Dube | ............... | G01N 33/2888 |
| 2022/0316975 A1 * | 10/2022 | Hamer | ............... | G01N 19/02 |

* cited by examiner

*Primary Examiner* — Freddie Kirkland, III
(74) *Attorney, Agent, or Firm* — Verrill Dana, LLP

(57) ABSTRACT

A tribometer and technique for determining torque at a physical interface of multiple rotating components. The tool and technique include aligning components about a rotational axis for independent rotation of each component. The components are in physical interface during the rotating with a resultant frictional torque. The torque may be measured by one or more torque meters during the rotating. This measured torque may be compared against an estimated torque for tool accuracy. Further, parameters such as load, temperature, component material, rotating rpm differentials and others may be varied to determine effect on measured frictional torque.

20 Claims, 5 Drawing Sheets

| Point No. | 1 | 2 | 3 | 4 | 5 | 6 | 7 | 8 | 9 | 10 |
|---|---|---|---|---|---|---|---|---|---|---|
| Run time seconds | 120 | 120 | 120 | 120 | 120 | 120 | 120 | 120 | 120 | 120 |
| RPMf right-side | 637.7 | 318.9 | 159.4 | 79.7 | 53.1 | 39.9 | 31.9 | 24.5 | 19.9 | 15.9 |
| RPMs left-side | 605.8 | 287.0 | 127.5 | 47.8 | 21.2 | 7.9 | 0.0 | -7.4 | -12.0 | -15.9 |
| Slip ratios % | 0.05 | 0.10 | 0.20 | 0.40 | 0.60 | 0.80 | 1.00 | 1.30 | 1.60 | 2.00 |
| Torque N-m (estimate) | 0.010 | 0.020 | 0.040 | 0.080 | 0.120 | 0.160 | 0.200 | 0.259 | 0.319 | 0.398 |
| 4 times the estimate Torque | 0.040 | 0.080 | 0.159 | 0.319 | 0.478 | 0.637 | 0.797 | 1.036 | 1.275 | 1.593 |

FIG. 4

FRICTIONAL TORQUE DETERMINATION TECHNIQUE

BACKGROUND

Frictionally interfacing components are used in a variety of different types of machinery and applications. Reciprocating pistons of an engine, wheels on tracks and a variety of other mechanical components may be utilized across a host of different industries. Regardless, detailed information regarding characteristics of the components may be of benefit to personnel constructing any application assembly utilizing such components. For example, known surface morphology, component materials, potential lubricants utilized at the interface and other factors may be of benefit when determining the architectural layout of the interfacing components.

Along these lines, a tribometer is often utilized in testing different component characteristics. More specifically, a tribometer may be set up where the face of a material component is rotated. The rotating component may interface an opposing face of a stationary component with the idea of closely replicating characteristics that might be exhibited in real world machinery of interfacing components. For example, the components may be of materials and surface finishes likely to be encountered in the real-world mechanical environment. In this way, predetermined factors such as load and speed may be applied through the rotating component to evaluate results such as resultant torque for a given period. By obtaining results from this type of tribology interface, suitable component characteristics for a given application may be established. Of course, related component aspects such as potential lubricant options may also be evaluated in this manner.

The described tribology testing setup is generally fairly unsophisticated in terms of interfacing component geometries. Thus, with known loads and speeds applied through the motor of the rotating component, variable results may be readily evaluated in light of known conventional algorithms. For example, the test rig may be a stationary pin interfacing a rotating plate or a stationary block that interfaces a rotating ring. Further, the rotating component is likely to rotate in one single direction. Depending on the application, this may be sufficient for evaluating interfacing component characteristics. In particular, resultant frictional torque is often determined in this manner.

Unfortunately, in real-world settings, it is often the case that both components are configured to move at the same time while interfacing. For example, interfacing gears are configured to both move during mechanical operation. Once more, interfacing gears are configured to move in opposite directions relative one another. This is the case for all gears whether it be small watch components or larger assemblies. This presents a challenge to obtaining component test results from a traditional tribology rig setup.

With the issue of multiple interfacing components that each move in mind, efforts have still been undertaken to obtain and interpret component performance results. For example, extensive modeling may be utilized. That is, estimating frictional torque over time for multiple moving and interfacing components may consist of utilizing a conventional tribometer where one of the components is stationary. Data obtained may be extrapolated in an effort to estimate frictional torque to both components. However, this is a very time consuming process of populating results for a variety of lubricants, materials, applied forces, surface morphologies and so forth. This time may be cut to a degree by reducing the number of experimental test runs with the rig and predicting others. Of course, the more that time is cut in this manner, the less accurate the test results.

SUMMARY

A method of determining frictional torque at an interface of two rotating bodies is disclosed. The method includes orienting faces of the bodies along a rotational axis with the faces meeting one another at the interface. Each body is centrally rotated about the axis for a predetermined period at a predetermined axial load and at an independent predetermined rpm for each body. Torque is then measured at the interface during the rotating.

BRIEF DESCRIPTION OF THE DRAWINGS

Implementations of various structure and techniques will hereafter be described with reference to the accompanying drawings. It should be understood, however, that these drawings are illustrative and not meant to limit the scope of claimed embodiments.

FIG. 4 is a table noting rotating component values employed by the tribometer of FIG. 1 correlated to estimated torque values attainable from the tool.

DETAILED DESCRIPTION

Embodiments are described with reference to a particular tribometer for determining torque related to interfacing moving components. Specifically, the embodiments depict a tribometer where the components are axially aligned and independently rotated relative to one another while physically contacting one another. Thus, different speeds may be applied independently to each component for evaluation of different parameters such as load, component materials and others while measuring resultant torque. However, additional aspects of the tribometer may be of benefit. For example, the resultant torque may be contrasted against estimated torque to ensure accuracy. Further, a variety of other dynamic characteristics may be tested such as the effect of temperature or lubricant on resultant torque. Regardless, so long as the tribometer or rig is axially oriented with multiple interfacing independent rotating components, appreciable benefit may be realized from the attained torque measurements.

Figure 1:
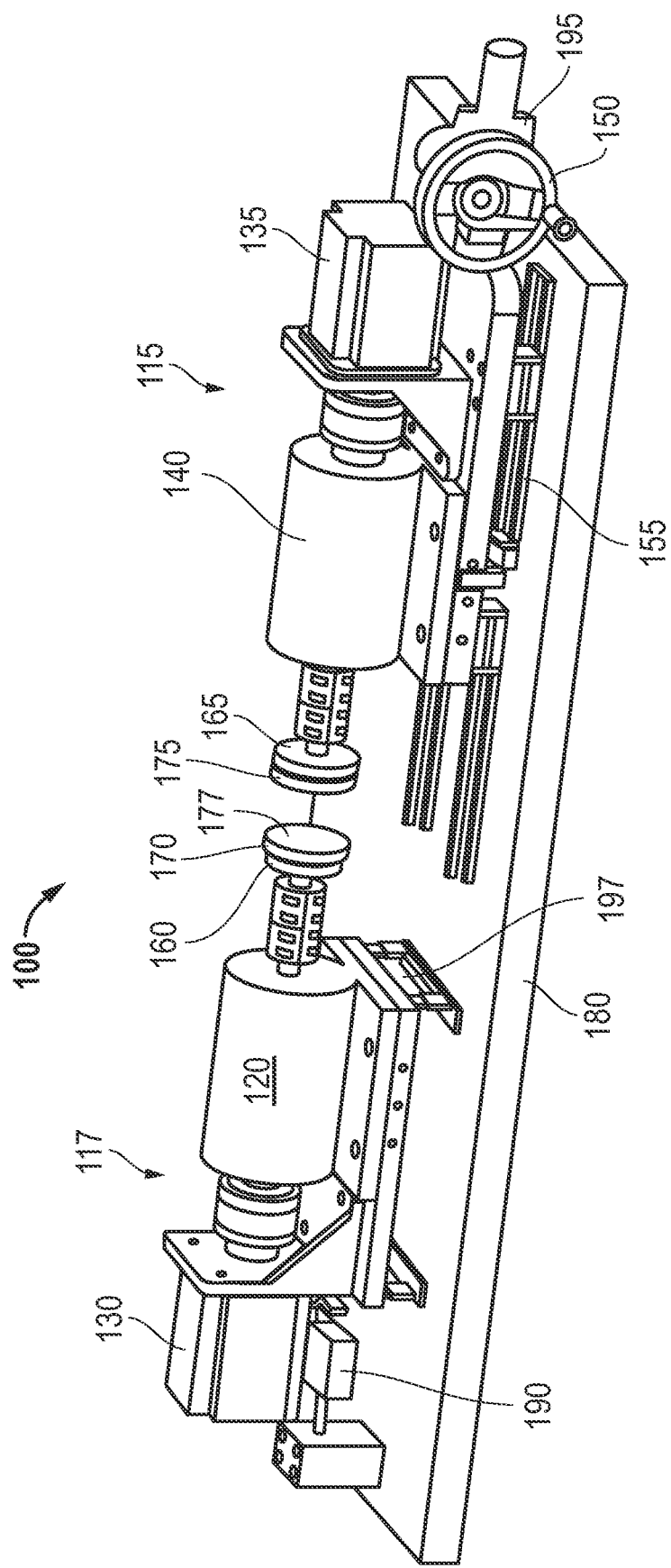
FIG. 1 is a side perspective view of an embodiment of an axially oriented dual rotating tribometer for measuring torque of interfacing components.

Referring now to FIG. 1, a side perspective view of an embodiment of an axially oriented dual rotating tribometer 100 is illustrated for measuring torque of interfacing components 170, 175. These components 170, 175 are sliding bodies that may both be moving. Thus, when physically interfacing, an instantaneous traction coefficient may result that is an order of magnitude smaller than a theoretical friction value as might be found where one of the components 170, 175 is kept in a stationary position.

The axial alignment of the tribometer 100 is apparent with the faces (e.g. 177) of each component 170, 175 arranged at platforms 160, 165 that are aligned for component meeting. Specifically, in the embodiment shown, a right side assembly 115 with a motor 140, torque meter 135, load applicator 150 and regulator 195 may be slidable along rails 155 to effect interfacing of the components 170, 175. The left side assembly 117 similarly includes its own motor 120, torque meter 130 and force detector 190. In one embodiment, the motors 120, 140 are quadrature servo motors with variable frequency controllers and breaking resistors. However, other types of drives may be utilized. In the embodiment shown, the left side assembly 117 is stationary with respect to an underlying base upon which the assemblies 115, 117 are mounted. This may be done for ease and reliability. However, both or either assembly 115, 117 may be configured for movement as described.

Continuing with reference to FIG. 1, the axial alignment of the assemblies 115, 117 is combined with a dual motor aspect. That is, as noted, each assembly 115, 117 includes its own dedicated motor 120, 140. Thus, ultimately, each component 170, 175 is independently rotated. This continues to be the case once the components 170, 175 are in interfacing contact with one another. As a result, the tribometer 100 may provide unique torque measurements from the torque meters 130, 135 of the separate assemblies. More specifically, rather than reliance on torque measurement values from a single torque meter applied to a single rotating component, torque values more reflective of dual rotating components may be attained. As detailed below, this may provide more enhanced and accurate torque values when attempting to model circumstances where multiple components are simultaneously moving such as in the case of gear interfacing (e.g. see FIG. 2A). Once more, the use of multiple in-line torque meters 130, 135 on both sides of the tool 100 may allow for balancing of rotational inertia such that torque bias from bearings may be accurately accounted for.

Rotation of the components 170, 175 may be in different directions relative to one another. Additionally, or alternatively, the rotations may be at different speeds. Indeed, in circumstances where the components 170, 175 are rotated in the same direction, different speeds will be utilized such that a differential exists from which friction and ultimately torque may be measured at the torque meters 130, 135. That is, for circumstances in which the components 170, 175 might rotate at the same speed and in the same direction, the lack of any differential would result in the components 170, 175 rotating as a uniform body in absence of friction or useful torque data.

Apart from differential speed, the load imparted may also be of use and significance. In the embodiment shown, the imparted load is governed by a regulator 195 that directs a load applicator 150 for positioning of the right side assembly 115 along the rails 155 as noted above. The left side assembly 117 is supported by flexible mounts 197 at the base 180 of the tool 100 which may be coupled to a load cell. Thus, load detection may be measured at the force detector 190 as suggested above. Thus, as with speed, load may be monitored over time while torque values are attained. Of course, load may alternatively or additionally be imparted by the left side assembly 117.

The tribometer 100 may be utilized to test estimated torque for given component interfacing under certain conditions over a predetermined period. So, for example, where torque is estimated at the differential speed multiplied by the coefficient of friction, load and the slip ratio, the tribometer may be used to measure and verify the torque estimate. In a specific example, as detailed further below, the components 170, 175 may be dry ceramic specimens rotated for two minutes of interface time. With a predetermined coefficient of friction and a constant sliding velocity, a torque estimate may be established and tested against the actually measured tribology torque results. That is, different loads and differentials may be effected by the tribometer 100 with different torque results measured by the torque meter 135 and compared against the estimated torque.

Figure 2A:
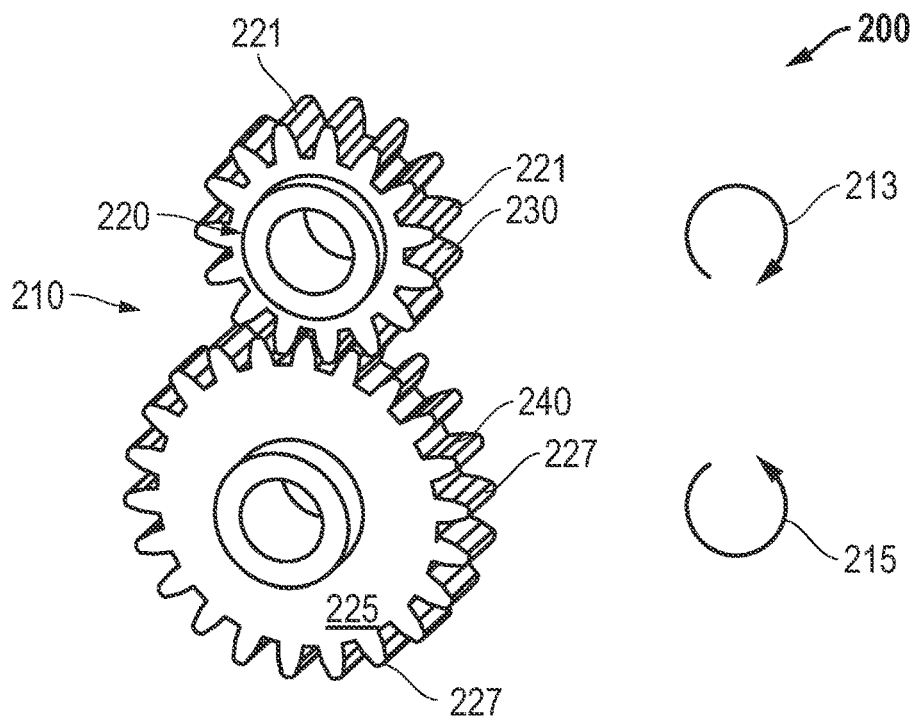
FIG. 2A is a perspective view of rotating components in the form of interfacing gears.

Referring now to FIG. 2A, a perspective view of an interfacing assembly 200 is shown where the rotating components 220, 225 are interfacing gears. The gears 220, 225 meet at an interface 210 where teeth 221, 227 engage with one another at surfaces 230, 240. So, for example, as one gear 220 rotates in one direction (e.g. clockwise 213), the other gear 225 rotates in the opposite (e.g. counterclockwise 215). Of course, this is a standard practice. However, in absence of a tribometer 100 as illustrated in FIG. 1, torque estimates and measured values remain a challenge. This is because conventional tribometers fail to employ specimens which are both moving while displaying a differential as described above. Thus, the obtained results may be more along classing Newtonian principles that are less applicable to such a scenario where both components 220, 225 are moving. As a result, more accurate estimates and measured torque values are available when applied to such circumstances where a tribometer 100 as illustrated in FIG. 1 is utilized.

The gear scenario of FIG. 2A may be one of the more practical applications for utilizing the tribometer 100 of FIG. 1. Specifically, the scenario involves both rolling and sliding with potential lubrication as discussed further below that may present an elasto-hydrodynamic environment. Thus, the ability to measure the friction force in a more representative way may be of enhanced benefit. The tool 100 of FIG. 1 may be utilized to represent various curvatures, surface finishes and coatings that may be considered for incorporation into teeth 221, 227.

Figure 2B:
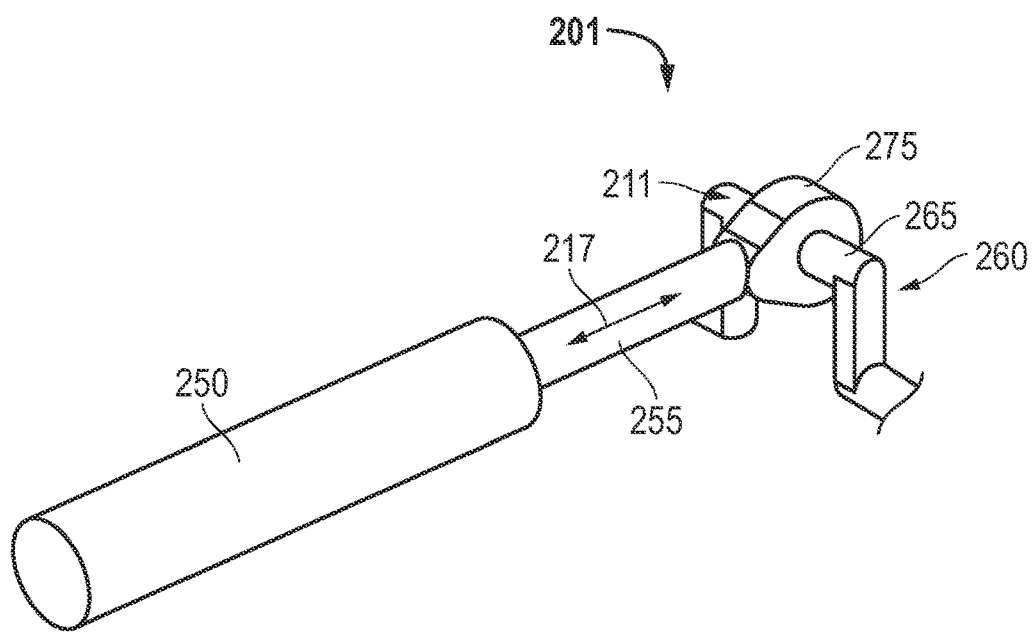
FIG. 2B is a perspective view of interfacing components in the form of a linear actuator for rotating a crank.

Referring now to FIG. 2B, a perspective view of another set 201 of interfacing components 265, 275 is shown in the form of a linear actuator for rotating a crank. Specifically, the actuator 250 includes a reciprocating implement 255 (see arrow 217) with a head 275 that is disposed about a rod 265 of a crank 260. Thus, a physical interface 211 is present where torque is presented. As with the scenario of FIG. 2A, a differential is always present when the components 265, 275 are moving due to the opposite direction of the movements. Regardless, the interface 211 again presents a scenario where multiple components 265, 275 are moving simultaneously while in physical interface with one another. Thus, another common scenario is presented where more accurate estimates and measured torque values may be attainable where a tribometer 100 as illustrated in FIG. 1 is available.

Figure 3:
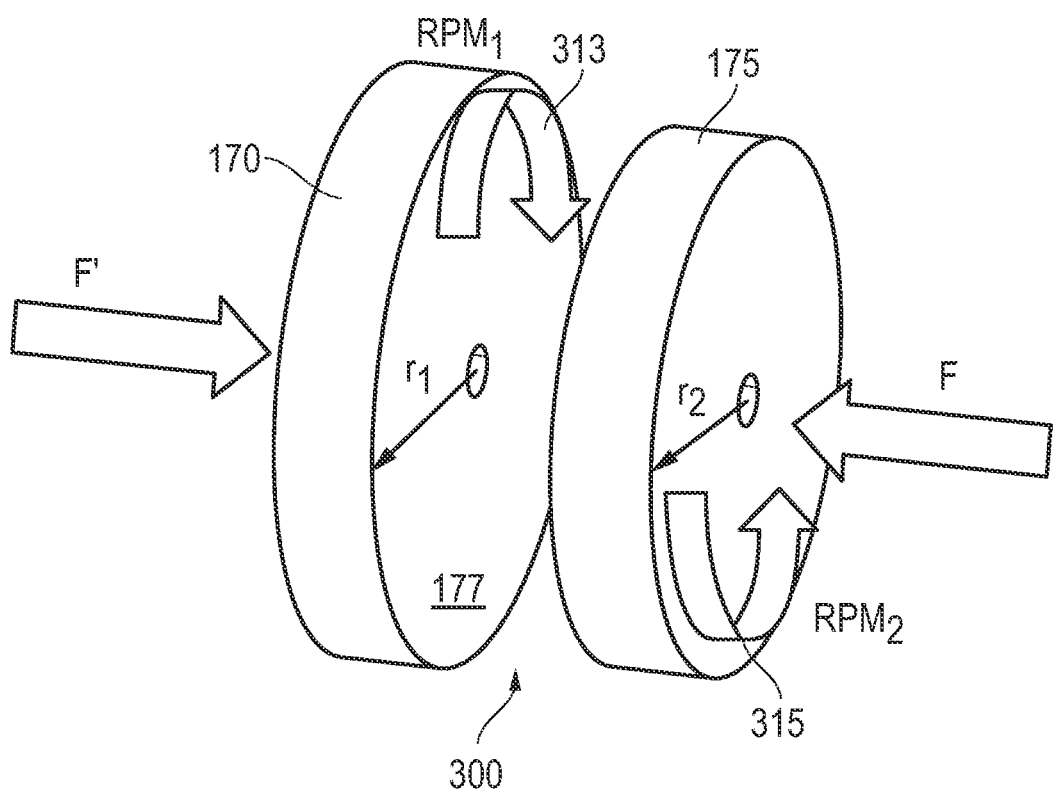
FIG. 3 is an enlarged perspective view of the interfacing components of FIG. 1 schematically highlighting axially oriented dual rotating component values at an interface.

Referring now to FIG. 3, with added reference to FIG. 1, an enlarged perspective view of the components 170, 175 are schematically illustrated. This view highlights the parallel orientation of the components 170, 175 with respect to one another in the axial direction at an interface 300. For example, forces (F' and F) are shown that may be applied from either side along the shared axis. This may correlate to a cumulative force or load such as imparted by the load applicator 150 and regulator 195 of the tribometer 100. Of course, in the circumstance of the tool 100, the left side assembly 117 does not contribute to this cumulative axial load apart from remaining stationary.

Similar to the load displayed by the forces (F' and F), each component 170, 175 is rotated (see $RPM_1$ and $RPM_2$). As illustrated, the rotations are in the opposite direction. Thus, a cumulative of the RPMs results in terms of each component face (e.g. 177) moving past one another. However, this is not required. That is, the components 170, 175 may be rotating in the same direction. So long as this does not occur at the same speed, a differential RPM may be provided that is above zero for sake of determining torque as suggested above.

Continuing with reference to FIG. 3, it is of note that the components 170, 175 are of different sizing. For example, note the different radii ($r_1$ and $r_2$). Continuing with added reference to FIG. 1, this may help to ensure that the torque reading by the tool 100 is accurate. That is, given that torque is a function of average radius of contact at the interface 300, utilizing a component 170 that is large enough to encompass the entirety of the adjacent component surface, means that the average radius of contact is known. More specifically, the entirety of the face of the smaller component 175 will account for this value.

Referring now to FIG. 4, a table noting rotating component values is shown that may be contrasted against torque values attained from tribometer 100 of FIG. 1. More specifically, estimated torque values are shown in the next to last row of the depicted table. These estimates are taken from the equation alluded to above where torque is estimated at the differential speed×Cof (coefficient of friction)×load×the slip ratio. Thus, the estimated torque for various factors may be contrasted against the torque as actually detected by the torque meters 130, 135 of the tool 100 of FIG. 1. In the case of the illustrated table, a guide is shown as a limit that is set at four times the torque estimate (see the last row). Thus, in circumstances where the measured torque exceeds the estimated guide limit, a presumption may be made that the detected torque value or a predetermined factor such as the speed differential is in error.

Continuing with reference to FIG. 4, note that ten different proposed test runs of interfacing components 170, 175 such as those of FIG. 1 are contemplated which provide ten different torque estimates as suggested above. These estimates may be compared against actual runs of the components 170, 175 with the tribometer 100 of FIG. 1 for accuracy. Of course, these runs and values are only exemplary and any number of different test run estimate values may be utilized. Regardless, for the embodiment shown, each run is proposed for two minutes (e.g. see the second row of "Run time seconds"). Additionally, for the chart, the components 170, 175 are dry ceramic specimens with a Cof of 0.190, an axial load of 11.2 lbs (e.g. 50 N) and a mean contact radius of 0.021 m. Similarly, while different RPM's are contemplated between the right side 115 and left side 117 assemblies, the differential is fairly constant at 32 RPM's or just below. Thus, for this chart, a variety of different slip ratios are estimated which may be contrasted against actual runs with the tool 100 of FIG. 1. For example, with reference to column 7, the left side assembly 117 of FIG. 1 is presumed to be held stationary with no RPM's while the right side 115 is rotated at 31.9 RPM, maintaining the noted differential. Thus, a slip ratio of 1 (e.g. 100%) is presumed. In this circumstance, a torque estimate of 0.20 Nm is predicted. This corresponds to 0.021 m (mean contact radius (R)) multiplied by 50 N (the load) multiplied by 0.19 (the Cof) multiplied by the slip ratio of 1.

The chart of FIG. 4 provides a range of different estimated torque results across a range of different slip ratios (5%-200%). Notice that anything over 100% reflects the rotation of the components 170, 175 in opposite directions. So, for example, columns 7-10 may be of interest for simulating circumstances like the gear interfacing of FIG. 2A. Regardless, with these estimates, test runs of the tool 100 of FIG. 1 may proceed to obtain actual torque values when employing these parameters. Thus, comparison may be made. So, for example, where a test run with the tool 100 for any given column provides actual torque data that exceeds the limit of the last row, it may be presumed that the tool 100 or run is compromised. For example, debris at the interface, accidental load change or some other factor has led to an increased torque detection. Thus, corrective action, such as cleaning debris from faces of the components 170, 175, may be taken so that the tool 100 may provide actual and reliable torque data.

With the estimated torque data utilized to confirm the accuracy of readings from the tool 100 of FIG. 1, a variety of other factors may now be tested with the tool 100. For example, the introduction of different lubricants, temperatures, other differentials, time periods, component materials and other variables may be introduced with actual and reliable torque measurements acquired from the torque meters 130, 135 of FIG. 1. In one embodiment, the tool 100 of FIG. 1 further includes a chamber for sealably housing the components 170, 175 during the interfaced rotating to allow for testing of different lubricants or maintaining of predetermined temperatures for torque measurements.

Figure 5:
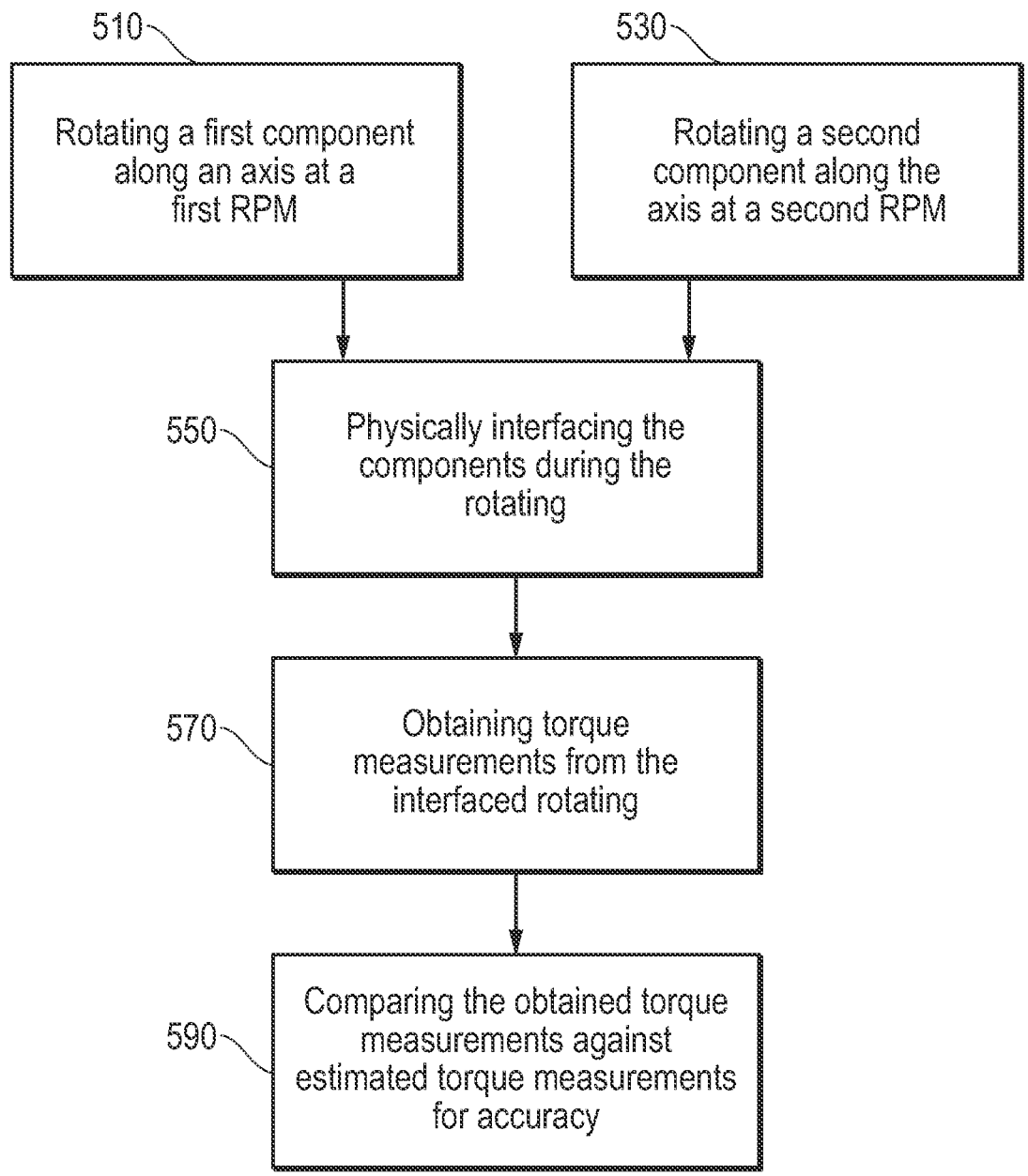
FIG. 5 is a flow-chart summarizing an embodiment of employing an axially oriented dual rotating tribometer to attain torque values.

Referring now to FIG. 5, a flow-chart is shown summarizing an embodiment of employing an axially oriented dual rotating tribometer to attain torque values. Specifically, as indicated at 510 and 530, components may be independently rotated along an axis at different RPM's. These components may be brought into interface during the rotating as noted at 550. Thus, a resultant frictional torque may be measured (see 570). Further, as a matter of confirming accuracy of the measured torque, the data may be compared to estimated torque values that are established based on characteristics of the components and operational parameters as indicated at 590.

Embodiments described hereinabove include a tribometer that provides frictional torque data reflective of circumstances where multiple components may be independently moved or rotated while in interface. This is achieved in a manner that helps avoid extensive modeling or other time consuming undertakings which may be more costly. Once more, an enhanced degree of accuracy may be attained from such a tribometer setup where replicating multiple moving parts in interface is sought.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A tribometer for determining frictional torque at an interfacing of two components, the tool comprising:

a first platform to accommodate a first of the two components;

a second platform to accommodate a second of the two components in alignment with the first component, the platforms to facilitate the interfacing of the components;

a first motor to rotate the first component about a shared axis;

a second motor to rotate the second component about the shared axis; and at least one torque meter to measure frictional torque of the rotating components.

2. The tribometer of claim 1 wherein the components are in parallel orientation with one another during the rotating.

3. The tribometer of claim 2 wherein the components are of different radii at the parallel orientation for the interfacing.

4. The tribometer of claim 1 wherein the components are sliding bodies.

5. The tribometer of claim 1 wherein the components are of ceramic construction.

6. The tribometer of claim 1 wherein at least one of the motors is a quadrature servo motor.

7. The tribometer of claim 6 wherein the quadrature servo motor includes at least one of a variable frequency controller and a breaking resistor.

8. A tribology system for determining frictional torque at an interfacing of two components, the system comprising:

a first assembly accommodating a first of the two components along a shared rotational axis with a motor for rotating the first component;

a second assembly accommodating a second of the two components about the shared axis and in alignment with the first component, the second assembly with a second motor for rotating the second component in physical interface with the first component, each motor facilitating independent rotation of each component; and at least one torque meter coupled to at least one of the assemblies to measure frictional torque during the physically interfaced rotating of the components.

9. The tribology system of claim 8 wherein the first assembly further comprises a load applicator for presenting a predetermined load to the interface.

10. The tribology system of claim 9 wherein the first assembly is slidably responsive to the load applicator for the presenting of the predetermined load.

11. The tribology system of claim 9 wherein the second assembly further comprises a force detector for sensing the load.

12. The tribology system of claim 11 wherein the second assembly further comprises flexible mounts and at least one load cell to facilitate the sensing by the force detector.

13. The tribology system of claim 8 further comprising a chamber for sealably accommodating the components during the rotating.

14. The tribology system of claim 13 wherein the chamber is configured for accommodating one of a lubricant and a predetermined temperature.

15. A method of determining frictional torque at an interface of two rotating components, the method comprising:

orienting faces of the components along a shared rotational axis with the faces meeting at the interface;

centrally rotating each component about the shared axis during the meeting, the rotating for a predetermined period at a predetermined axial load and at an independent predetermined rpm for each component; and measuring the torque at the interface during the rotating.

16. The method of determining torque of claim 15 further comprising comparing the measured torque against estimated torque for accuracy.

17. The method of claim 15 wherein the measuring comprises employing multiple in-line torque meters coupled to motors driving the rotating.

18. The method of claim 15 wherein the measuring of the torque at the interfacing of the components provides a torque estimate of interfacing gears.

19. The method of claim 15 wherein the independent predetermined rpm for each component includes one of rotating the components in opposite directions and rotating the components at different speeds.

20. The method of claim 15 further comprising introducing a variable to at least one of the components, the variable selected from a group consisting of a lubricant, a predetermined temperature and a component material.

* * * * *